United States Patent Office 2,920,094
Patented Jan. 5, 1960

2,920,094

ORGANOSILICON COMPOUNDS

Frank Fekete, Verona, Pa., assignor to Union Carbide Corporation, a corporation of New York No Drawing. Application December 23, 1958
Serial No. 782,383

4 Claims. (Cl. 260—448.2)

This invention relates to novel organosilicon compounds which contain two phosphorus atoms, one bonded to silicon through a divalent hydrocarbon group and the other directly attached to silicon. My novel compounds are represented by the formula:

$$R_2PR''\underset{R'}{\overset{R'O}{\underset{|}{Si}}}PR_2$$
(with O double-bonded to each P)

wherein R represents a hydrogen atom, a hydrocarbyl group or a hydrocarbyloxy group and need not be the same throughout the same molecule, R' is a hydrocarbyl group and need not be the same throughout the same molecule and R'' is a divalent hydrocarbon group free of aliphatic unsaturation. By the term "hydrocarbyl" as employed herein is meant a monovalent hydrocarbon group, i.e., a group composed of carbon and hydrogen. Examples of hydrocarbyl groups as represented by R and R' are methyl, ethyl, propyl, butyl, stearyl, vinyl, allyl, oleyl, cyclohexyl, cyclohexenyl, cyclopentyl, cyclopentenyl, phenyl, tolyl, naphthyl, phenylethyl, and the like. By the term "hydrocarbyloxy" as used herein is meant a monovalent group composed of a hydrocarbyl group bonded to ether oxygen, i.e., R'O— where R' is a hydrocarbyl group. Examples of hydrocarbyloxy groups are methoxy, ethoxy, propoxy, butoxy, stearoxy, vinyloxy, allyloxy, oleyloxy, cyclohexyloxy, cyclohexenyloxy, phenoxy, tolyloxy, naphthyloxy, phenylethoxy, and the like. Divalent hydrocarbon groups free of aliphatic unsaturation as represented by R'' include methylene, —CH$_2$—; ethylene, —CH$_2$CH$_2$—; trimethylene, —CH$_2$CH$_2$CH$_2$—; octadecamethylene, —(CH$_2$)$_{18}$—; phenylene, —C$_6$H$_4$—; cyclohexylene, —C$_6$H$_{10}$—; tolylene, CH$_3$C$_6$H$_3$=; naphthylene, —C$_{10}$H$_6$—; phenylenedimethylene, —CH$_2$C$_6$H$_4$CH$_2$—; and the like.

My preferred compounds are those described by the above formulas wherein R, R', and R'' each individually contain from 1 to 18 carbon atoms. Illustrative of the novel compounds are (diphenylphosphinylethyl) (diphenylphosphinyl) dimethylsilane, (C$_6$H$_5$)$_2$P(O)(CH$_2$)$_2$Si(CH$_3$)$_2$P(O)(C$_6$H$_5$)$_2$ (methylphenoxyphosphinylstearyl) (methylphenoxyphosphinyl) diethylsilane, (CH$_3$)(C$_6$H$_5$O)P(O)C$_{18}$H$_{36}$Si(C$_2$H$_5$)$_2$
P(O)(CH$_3$)(OC$_6$H$_5$)

(stearylmethoxyphosphinylcyclohexyl) (stearylmethoxyphosphinyl) diphenylsilane, (C$_{18}$H$_{37}$)(CH$_3$O)P(O)C$_6$H$_{10}$
Si(C$_6$H$_5$)$_2$P(O)(C$_{18}$H$_{37}$)(OCH$_3$)

(oleylmethylphosphinylphenyl) (oleylmethylphosphinyl) methylphenylsilane;

(C$_{18}$H$_{35}$)(CH$_3$)P(O)C$_6$H$_4$Si(CH$_3$)
(C$_6$H$_5$)P(O)(C$_{18}$H$_{35}$)(CH$_3$)

(diethoxyphosphinylpropyl) (diethoxyphosphinyl)methylvinylsilane, (C$_2$H$_5$O)$_2$P(O)(CH$_2$)$_3$Si(CH$_3$)
(CH=CH$_2$)P(O)(OC$_2$H$_5$)$_2$ (cyclohexoxycyclohexylphosphinylethyl) (cyclohexoxycyclohexylphosphinyl) dinaphthylsilane, (C$_6$H$_{11}$O)(C$_6$H$_{11}$)P(O)(CH$_2$)$_2$
Si(C$_{10}$H$_7$)$_2$P(O)(C$_6$H$_{11}$)(OC$_6$H$_{11}$)

(distearoxyphosphinylmethylphenylmethyl) (distearoxyphosphinyl) dimethylsilane, (C$_{18}$H$_{37}$O)$_2$P(O)CH$_2$C$_6$H$_4$CH$_2$
Si(CH$_3$)$_2$P(O)(OC$_{18}$H$_{37}$)$_2$ (divinylphosphinylethyl) (divinylphosphinyl)ethylphenylsilane, (CH$_2$=CH)$_2$P(O)C$_2$H$_4$Si(C$_2$H$_5$)
(C$_6$H$_5$)P(O)(CH=CH$_2$)$_2$ These novel compounds are conveniently made by a process involving the reaction of a quinquevalent phosphorus compound, e.g., hydrocarbyl-substituted phosphine oxides, phosphonates, phosphinates, having a single quinquevalent phosphorus atom bonded at one valence to a hydrogen atom, bonded at two other valences to one oxo-oxygen atom and bonded at each of the two remaining valences to a hydrocarbyl or hydrocarbyloxy group, with an organosilane having one halohydrocarbyl group, i.e., XR''— where R'' is as previously defined and X is a halogen atom, e.g., chloro, bromo, and iodo, bonded to silicon, each remaining unfilled valence of silicon being satisfied by a hydrocarbyl group.

The hydrocarbyl-substituted phosphine oxides, phosphonates and phosphinates employed as starting materials in this process are represented by the formula:

$$R_2\overset{O}{\overset{\|}{P}}H$$

wherein R is as previously defined. Illustrative hydrocarbon-substituted phosphine oxides, phosphonates and phosphinates are: (C$_6$H$_5$)$_2$P(O)H, (C$_6$H$_5$)(C$_2$H$_5$)P(O)H, (C$_6$H$_5$)P(O)H$_2$, (C$_6$H$_5$)(C$_4$H$_9$)P(O)H
(CH$_3$C$_6$H$_4$)P(O)H$_2$, (CH$_3$C$_6$H$_4$)(C$_2$H$_5$)P(O)H
(C$_6$H$_5$O)(C$_2$H$_5$)P(O)H, (C$_6$H$_5$O)P(O)H$_2$
(xylyloxy)P(O)H$_2$, (C$_6$H$_5$)(C$_8$H$_{17}$O)P(O)H
(C$_2$H$_5$O)(C$_6$H$_5$)P(O)H, (C$_4$H$_9$O)(C$_6$H$_5$)P(O)H
(CH$_3$)P(O)H$_2$, (C$_{18}$H$_{37}$)P(O)H$_2$, (C$_{18}$H$_{35}$)P(O)H$_2$,
(C$_6$H$_{11}$)P(O)H$_2$, (C$_6$H$_5$O)P(O)H$_2$, (C$_2$H$_5$O)P(O)H$_2$,
(C$_8$H$_{17}$O)P(O)H$_2$, (C$_{18}$H$_{37}$)$_2$P(O)H
(CH$_3$)(C$_{18}$H$_{37}$O)P(O)H, (C$_6$H$_{11}$)$_2$P(O)H
(CH$_3$O)(CH$_3$)P(O)H, (C$_6$H$_{11}$O)(C$_4$H$_9$)P(O)H
(C$_6$H$_5$O)$_2$P(O)H, (xylyloxy)$_2$P(O)H, (CH$_3$O)$_2$P(O)H,
(C$_{18}$H$_{37}$O)$_2$P(O)H, (C$_6$H$_5$O)(CH$_2$)P(O)H
(C$_{18}$H$_{37}$)(CH$_3$O)P(O)H, (C$_{18}$H$_{35}$)(CH$_3$)P(O)H
(C$_2$H$_5$O)$_2$P(O)H, (C$_6$H$_{11}$O)(C$_6$H$_{11}$)P(O)H
(C$_{18}$H$_{37}$O)$_2$P(O)H, (CH$_2$=CH)$_2$P(O)H, and the like.

Phosphorus compounds also useful as starting materials in the processes are the alkali metal salts of the above-described hydrocarbyl-substituted phosphine oxides, phosphonates and phosphinates. These alkali metal salts are represented by the formula:

$$R_2\overset{O}{\overset{\|}{P}}M$$

wherein R is as previously defined and illustrated and M is an alkali metal, for example, sodium, potassium, lithium, and caesium. Examples of alkali metals salts of hydrocarbon-substituted phosphine oxides and phosphinates are: (C$_6$H$_5$)$_2$P(O)Na, (C$_6$H$_5$)(C$_2$H$_5$)P(O)Na, (C$_6$H$_5$)P(O)HNa, (C$_6$H$_5$)(C$_4$H$_9$)P(O)Li
(CH$_3$C$_6$H$_4$)P(O)HNa, (CH$_3$C$_6$H$_4$)(C$_2$H$_5$)P(O)K (C₆H₅O)(C₂H₅)P(O)Cs, (C₆H₅O)P(O)HNa
(xylyloxy)P(O)HNa, (C₆H₅)(C₈H₁₇O)P(O)K
(C₂H₅O)(C₆H₅)P(O)Li, (C₄H₉O)(C₆H₅)P(O)Na
(CH₃)P(O)HNa, (C₁₈H₃₇)P(O)HK, (C₆H₁₁)P(O)HK,
(C₆H₅)P(O)HNa, (C₂H₅O)P(O)HNa
(C₈H₁₇O)P(O)HK, (C₁₈H₃₇)₂P(O)Li,
(CH₃)(C₁₈H₃₇O)P(O)Cs, (C₆H₁₁)₂P(O)Na
(CH₃O)(CH₃)P(O)K, (C₆H₁₁O)(C₄H₉)P(O)Na
(C₆H₅O)₂P(O)Na, (xylyloxy)₂P(O)Li
(CH₃O)₂P(O)Na, (C₁₈H₃₇O)₂P(O)K
(C₂H₅O)(CH₂)P(O)Cs, (C₁₈H₃₇)(CH₃O)P(O)Na
(C₁₈H₃₅)(CH₃)P(O)K, (C₂H₅O)₂P(O)Na
(C₆H₁₁O)(C₆H₁₁)P(O)Na, (C₁₈H₃₇O)₂P(O)Na
(CH₂=CH)₂P(O)Na, and the like. Preferred hydrocarbon substituted phosphine oxides, phosphonates and phosphinates and alkali metal salts thereof employed as starting materials are those defined above wherein R contains from 1 to 18 carbon atoms.

The nomenclature employed herein to designate phosphorus compounds is in accordance with the rules for naming compounds containing one phosphorus atom as approvie by the General Nomenclature Committee of the Organic Division of the American Chemical Society as published in "Chemical and Engineering News," volume 30, No. 43, pp. 4515–4522, Oct. 27, 1952. The use of "(O)" in the formulas herein designates oxygen which is bonded to only phosphorus, e.g., P=O, and no differentiation is being made herein between →O (or semipolar linkage) and =O (or double bond linkage).

Organosilanes employed as starting materials in this process are represented by the formula:

wherein R′, R″ and X are as previously defined and illustrated. Typical organosilanes are chloropropyldiphenylchlorosilane, chlorocyclohexyldiphenylchlorosilane, chlorophenylmethylphenylchlorosilane, chorostearyldiethylchlorosilane, bromopropylmethylvinylbromosilane, (chloromethylphenylmethyl)dimethylchlorosilane, and the like. Preferred organosilanes employed as starting materials are those as defined above wherein the hydrocarbyl group, R′, and the divalent hydrocarbon group, R″, each have from 1 to 18 carbon atoms.

The process involves the metathesis reaction shown by the equation:

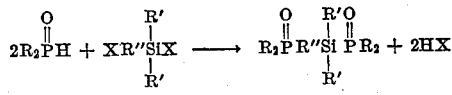

wherein R, R′, R″ and X are as previously defined, and HX is a hydrogen halide. When a hydrocarbon-substituted phosphine oxide, phosphonate or phosphinate alkali metal salt is employed as the starting phosphorus compound an alkali metal halide, MX, where M and X are as previously defined, is formed instead of hydrogen halide in addition to the phosphorus-silicon product.

The process is carried out by bringing the organosilane and the phosphorus compound into reactive contact and continuously removing from the reaction zone the hydrogen or metal halide as it is formed in the reaction. Mole ratios of phosphorus compound and organosilane employed in the reaction are not narrowly critical. Stoichiometric amounts are preferred for efficient reaction and ease of product recovery. For example, one mole of phosphorus-bonded hydrogen or alkali metal is preferred for each mole of halogen bonded through hydrocarbon to silicon and halogen bonded directly to silicon desired to be displaced. Other than stoichiometric amounts of starting materials can also be used. The temperature of the reaction is not narrowly critical and can be varied in accordance with the speed of reaction desired. Temperatures of 75° C. to 300° C. are advantageous in providing a smooth reaction and high yields of products. Temperatures below 75° C. can be employed if desired but the reaction rate is slowed. Temperatures above 300° C. can also be employed but the likelihood of reduced yields is greater. My process is advantageously carried out at atmospheric pressure or at whatever pressures exist in the particular reaction vessel employed without purposely applying increased or reduced pressures. Sub-atmospheric or, super-atmospheric pressures can be employed, however, if desired. Where one or more of the starting materials are gaseous at the chosen reaction temperature, super-atmospheric pressures and a closed reaction vessel are conveniently employed to bring the starting materials into reactive contact. No catalysts are required although suitable catalysts such as tetramethyl ammonium chloride, trimethyl benzoyl ammonium chloride, and the like, can be employed for whatever advantage they may provide. Solvents also are not required but are useful in simplifying the handling of the reaction mixture. If a solvent is employed, xylene, toluene, benzene, methyl ethyl ketone, dimethyl formamide and the like are recommended. A solvent which dissolves the starting materials and the products but does not dissolve formed hydrogen halides or alkali metal halides is particularly useful in removing the hydrogen or alkali metal halides from the reaction zone. Such solvents include xylene, toluene, benzene, dimethyl formamide, and the like. The formed hydrogen halide or alkali metal halide is continuously removed from the reaction zone by any suitable method or technique of which many are known. The formed alkali metal halides are most effectively removed by precipitation which can be assured by employing a solvent as listed above which dissolves the silicon compound and phosphorus compound starting materials and the phosphorus-silicon product but does not dissolve the formed alkali metal. A particularly suitable technique for removing formed hydrogen halide is to employ a hydrogen halide acceptor, such as the tertiary amines, added to the reaction mixture in the approximate stoichiometric amounts based on the amount of hydrogen halide expected to be formed in the reaction. Triethyl amine, pyridine, tributyl amine, and the like are some of the excellent hydrogen halide acceptors. Excess amounts of the acceptor over and above the stoichiometric amount is preferably employed to assure the substantially complete removal of the hydrogen halide. Primary amines, secondary amines, and ammonia can also be employed in controlled amounts as hydrogen halide acceptors. For example, the primary and secondary amines and ammonia can be continuously or intermittently added (e.g., by titration) as the reaction proceeds in such quantities that maintain the reaction mixture slightly acidic to slightly basic. The hydrogen halide can even be continuously stripped by boiling it from the reaction mixture as it is formed employing techniques within the chemist's skill. Although it is not necessary in order to obtain a product, it is preferable for best yields of product, no matter what particular technique is employed in removing hydrogen halide to maintain the pH of the system above about 6 to prevent decreased yields due to possible side reactions involving the formed hydrogen halide, and below about 8 when strongly basic acceptors or other materials are employed to prevent possible side reactions involving the silicon compound in the event moisture is also present.

The product is isolated by any suitable procedure many of which are commonly employed by persons skilled in the art. For example, the distillable products, i.e., in general the silanes, are most readily isolated and purified by fractional distillation. The high boiling products, i.e., in general the siloxanes, are most readily isolated by removing foreign material, e.g., unreacted starting materials and by-products; by distillation, washing with solvents or filtering or any combination of these procedures. Other isolation procedures commonly employed by skilled chemists, e.g., recrystallization procedures for solid crystalline products, can also be used for isolating the products disclosed herein.

The novel organo-silicon compounds of this invention are useful as additives to known silicone oils and greases employed as lubricants for improving the lubricity of and imparting flame resistance to such oils and greases.

The following examples are presented:

Example 1

The metal salt of 2-ethylhexyl phosphonate, $$(C_8H_{17}O)_2P(O)H$$

was formed by drying the phosphonate over anhydrous sodium sulfate and then mixing it with toluene and adding the desired amount of metallic sodium and heating the mixture to the reflux temperature of toluene (at atmospheric pressure) and holding it there until all the sodium had dissolved. The resultant product is the sodium salt of 2-ethylhexyl phosphonate, $(C_8H_{17}O)_2P(O)Na$. Two moles of this salt were prepared by this procedure. To the two moles of the sodium salt of 2-ethylhexyl phosphonate (648 grams) was added 1 mole (143 grams) of chloromethyldimethylchlorosilane, and the mixture refluxed at the boiling point (at atmospheric pressure) of this composition. Immediately sodium chloride began to form and the refluxing was continued for a period of 6 hours after which time a very dark purple salt had formed and the reaction was complete. The product formed was [di(2-ethylhexoxy)phosphinylmethyl][di-(2-ethylhexoxy) phosphinyl]dimethylsilane represented by the formula:

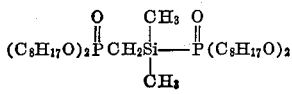

and a total of 674 grams of the above product was formed. A total of 115 grams of sodium chloride was obtained which indicates an almost quantitative yield of the desired product. Infrared analytical and molar refraction data substantiate the structure.

Example 2

Two moles of the sodium salt of diethyl phosphonate, $(C_2H_5O)_2P(O)H$, were formed by reacting the phosphonate with two moles of metallic sodium, the reaction being carried out in dry xylene and the initial reaction temperature being held at $-25°$ C. until part of the reaction had occurred and then the reaction allowed to be completed by raising the temperature to approximately 40° C. The temperature was then raised to reflux (at atmospheric pressure) and with continuous stirring allowed to heat further for a period of 2 hours. The desired product, the sodium salt of diethyl phosphonate, $(C_2H_5O)P(O)Na$, was obtained in solution and kept in this medium. To the 320 grams of this salt was added 1 mole or 143 grams of chloromethyldimethylchlorosilane. The mixture was allowed to reflux (at atmospheric pressure) for a period of 4 hours after which time a purple sodium chloride salt had completely precipitated from solution. The reaction was stopped and the sodium chloride separated from the liquid product by filtering through a Buchner funnel. The salt was dried and weighed and a total of 115 grams of NaCl was obtained. This indicated that a complete reaction giving the desired product was accomplished. The xylene was distilled from the liquid product. The resultant product, (diethoxyphosphinylmethyl)(diethoxyphosphinyl) dimethylsilane, $$(C_2H_5O)_2P(O)CH_2Si(CH_3)_2P(O)(OC_2H_5)_2$$

was obtained as a light, yellow liquid oil. Infra-red analytical and molar refractive data substantiate the structure of this compound.

Example 3

The sodium salt of dimethyl phosphonate, $$(CH_3O)_2P(O)Na$$

was prepared in the manner analogous to the procedure described in Example 2, employing, however, dimethyl phosphonate instead of diethyl phosphonate. To this sodium salt, one mole of chloromethyldimethylchlorosilane was added and the mixture allowed to reflux (at atmospheric pressure) for a period of 4 hours. After this period, sodium chloride was observed to have formed and precipitated from the solution. The product, (dimethoxyphosphinylmethyl) (dimethoxyphosphinyl) dimethylsilane, represented by the formula:

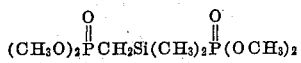

was obtained. The yield of product obtained was 40 percent. Infra-red analytical data confirmed the structure of this product.

Example 4

A total of 2 moles (276 grams) of diethyl phosphonate $[(C_2H_5O)_2P(O)H]$ were mixed with 400 cubic centimeters of anhydrous xylene in a three necked flask fitted with condenser, stirrer, and dropping inlet. To this mixture were added 2 moles (46 grams) of metallic sodium (Na). The reaction occurred at room temperature and was cooled continuously. The temperature rose rapidly to 120° C. and by this time all of the Na was in solution and reacted. The mixture was further stirred and heated at this temperature for 1 hour. Sodium diethyl phosphonate was thus obtained. This mixture was cooled to room temperature and 1 mole of $ClCH_2Si(CH_3)_2Cl$ in xylene was added to the mixture by dropping funnel in a dropwise fashion with continuous stirring. The temperature was raised to 120° C. by heating while the chlorosilane was being added. Almost instantly with addition NaCl was precipitated out, giving a purple-colored solution. The reaction temperature was held at 130° C. and the mixture stirred for an additional 4 hours to insure complete reaction. The mixture was cooled and stirring was stopped. NaCl separated from the solution. Part of the product was removed by filtering and decanting and then the xylene was removed by distillation to give the desired product. The separated NaCl was weighed and found to be 115.0 grams, almost theoretical for complete reaction. The product was a light yellow fluid. The yield of product was 90 to 98 percent. Analysis of the product confirmed the formula $$(C_2H_5O)_2P(O)CH_2Si(CH_3)_2P(O)(OC_2H_5)_2$$

i.e., (diethoxyphosphinylmethyl)(diethoxyphosphinyl)-dimethylsilane.

Example 5

The process of Example 2 is conducted employing, however, phenyl ethylphosphinate $$(C_6H_5O)(C_2H_5)P(O)H$$

instead of diethyl phosphinate to form sodium phenyl ethylphosphinate, $(C_6H_5O)(C_2H_5)P(O)Na$. Chlorophenyl(diphenyl)chlorosilane is added to and reacted with the sodium phenyl ethylphosphinate in the manner described in Example 2. The resultant product is (phenoxyethylphosphinylphenyl) (phenoxyethylphosphinyl) diphenylsilane

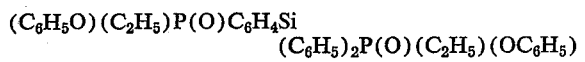

Example 6

The process of Example 2 is conducted employing, however, stearylmethylphosphine oxide $$(C_{18}H_{37})(CH_3)P(O)H$$

instead of diethyl phosphinate to form sodium stearylmethylphosphine oxide, $(C_{18}H_{37})(CH_3)P(O)Na$. Chlorocyclohexyldimethylchlorosilane is then added to and reacted with the sodium stearylmethylphosphine oxide in the manner described in Example 2. The resultant product is (stearylmethylphosphinylcyclohexyl)(stearylmethylphosphinyl)dimethylsilane

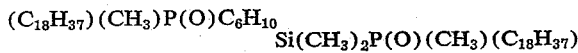

What is claimed is:

1. As a novel composition of matter, organosilanes represented by the formula:

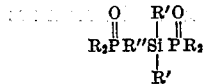

wherein R is a member from the class consisting of hydrocarbyl groups and hydrocarbyloxy groups, R' is a hydrocarbyl group, R and R' each need not be the same throughout the same molecule, and R'' is a divalent hydrocarbon group free of aliphatic unsaturation.

2. As a novel composition of matter, [di(2-ethylhexoxy) phosphinylmethyl][di(2-ethylhexoxy)phosphinyl]dimethylsilane.

3. As a novel composition of matter, (diethoxyphosphinylmethyl)(diethoxyphosphinyl)dimethylsilane.

4. As a novel composition of matter, (dimethoxyphosphinylmethyl)(dimethoxyphosphinyl)dimethylsilane.

References Cited in the file of this patent

UNITED STATES PATENTS 2,768,193    Gilbert _____ Oct. 23, 1956

OTHER REFERENCES

Malatesta: "Gazz. Chim. Ital.," vol. 80 (1950), pp. 527–32.